US008146222B2

(12) United States Patent
Frauen et al.

(10) Patent No.: US 8,146,222 B2
(45) Date of Patent: Apr. 3, 2012

(54) DEVICE AND METHOD FOR JOINING AND TACKING SECTIONS FOR TRANSPORTATION VEHICLES

(75) Inventors: Holger Frauen, Hamburg (DE); Tomas Gnauck, Neu Wulmstorf (DE); Eike Klemkow, Schwerin (DE)

(73) Assignee: Airbus Deutschland GmbH, Hamburg (DE)

( * ) Notice: Subject to any disclaimer, the term of this patent is extended or adjusted under 35 U.S.C. 154(b) by 1229 days.

(21) Appl. No.: 11/286,763

(22) Filed: Nov. 22, 2005

(65) Prior Publication Data

US 2006/0162140 A1 Jul. 27, 2006

(30) Foreign Application Priority Data

Nov. 22, 2004 (DE) .......................... 10 2004 056 286

(51) Int. Cl.
*B21D 53/88* (2006.01)
*B23C 1/00* (2006.01)
*B23K 1/14* (2006.01)
*B23Q 3/00* (2006.01)
*B25B 1/20* (2006.01)
*B25B 27/14* (2006.01)

(52) U.S. Cl. ...... 29/281.1; 29/56.6; 29/281.5; 29/897.2; 228/44.3; 228/49.1; 269/37; 269/287

(58) Field of Classification Search .................. 29/56.6, 29/281.1, 281.5, 407.04, 464, 466, 467, 897.2, 29/281.4; 228/44.3, 49.1, 4.1; 269/37, 42, 269/287, 288; 219/158, 159, 161; 901/42
See application file for complete search history.

(56) References Cited

U.S. PATENT DOCUMENTS

| | | | | | |
|---|---|---|---|---|---|
| 2,374,894 | A | * | 5/1945 | Pioch et al. | 29/466 |
| 2,472,317 | A | * | 6/1949 | Sorensen et al. | 29/466 |
| 5,694,690 | A | | 12/1997 | Micale | |
| 6,378,186 | B1 | * | 4/2002 | Angel | 29/281.1 |
| 6,408,517 | B1 | * | 6/2002 | Lehmker et al. | 29/897.2 |
| 7,469,473 | B2 | * | 12/2008 | Savoy | 29/897.2 |
| 2002/0092149 | A1 | * | 7/2002 | Wolf et al. | 29/464 |
| 2005/0015962 | A1 | * | 1/2005 | Sturm et al. | 29/468 |

FOREIGN PATENT DOCUMENTS

| | | |
|---|---|---|
| DE | 19834703 C1 | 12/1999 |
| DE | 19929471 C1 | 1/2001 |
| DE | 10134852 B4 | 8/2002 |
| DE | 10122092 A1 | 11/2002 |

* cited by examiner

*Primary Examiner* — Alexander P Taousakis
(74) *Attorney, Agent, or Firm* — Christopher Paradies; Fowler White Boggs P.A.

(57) ABSTRACT

A device and method for joining and tacking several individual components independently of shape and/or size to form inherently rigid, transportable sections for transportation vehicles, such as an aircraft is disclosed. According to one embodiment of the invention, the individual components may be spatially positioned relative to each other independently of shape and/or size. The spatial positions of the individual components may be determined by a measuring device, such as a laser measuring device, and varied via several positioning devices until a preset spatial position of the individual components has been reached in which the individual component are tacked together to form a section. In another embodiment, the positioning devices may be designed as base positioners, a first lateral positioner, a second lateral positioner, an upper positioner as well as an inner positioner. Joining and tacking of several individual components 1 may form varying sections such as sections with varying cross sectional geometries and/or cross sectional dimensions and/or linear dimensions for different types of aircraft or for derivatives of the same aircraft types. In addition, the sections may have two working platforms on either side of the section.

39 Claims, 9 Drawing Sheets

DEVICE AND METHOD FOR JOINING AND TACKING SECTIONS FOR TRANSPORTATION VEHICLES

RELATED APPLICATION

This application claims the benefit of the filing date of German Patent Application No. 10 2004 056 286.5 filed Nov. 22, 2004, the disclosure of which is hereby incorporated herein by reference.

FIELD OF THE INVENTION

The field relates to manufacturing of sections for transportation vehicles, such as aircraft, from component parts.

TECHNOLOGICAL BACKGROUND

Devices and methods for forming sections, in particular for aircraft, are known that are each being aligned relative to a section with a specific shape and/or size, in particular with a specific cross sectional geometry or cross sectional dimension and/or linear dimension. A special construction site tailored to the respective section to be fabricated must be provided for each section having different geometries, thereby significantly increasing production costs. In addition, the sections generally remain at the respective construction site in known devices and methods, such that in particular the investment-intensive automatic production equipment are not utilized to capacity during time-consuming manual operations to configure or reconfigure the equipment for sections with different geometries.

Previously known devices and methods are not suitable for the shape and/or size-independent formation of sections for aircraft using at least partially automated production processes.

SUMMARY OF THE INVENTION

A device and a method that joins and tacks individual components independently of shape and/or size to form sections for various aircraft types or aircraft type derivatives within a device. Sections, such as sections with different cross sectional geometries and/or cross sectional dimensions and/or linear dimensions, may be joined and tacked from individual components in one device. In addition, retention times of the sections in the device may be minimized.

According one embodiment, a device for joining and tacking several individual components independently of shape and/or size to form inherently rigid, transportable sections for transportation vehicles, such as aircraft, wherein the individual components may be spatially positioned relative to each other independently of shape and/or size using a plurality of positioning devices.

According one embodiment, a method for joining and tacking several individual components independently of shape and/or size to form inherently rigid, transportable sections for transportation vehicles, such as aircraft, wherein the spatial positions of the individual components may be determined by a measuring device, a laser measuring device, and varied via several positioning devices until a preset spatial position of the individual components has been reached in which the individual components are tacked together into a section.

Because the individual components may be spatially positioned relative to each other using several positioning devices independently of shape and/or size, the device according to one embodiment may be used to join and subsequently tack individual components to form different sections, such as sections with varying cross sectional geometries and/or cross sectional dimensions and/or linear dimensions, for various aircraft types or numerous aircraft type derivatives.

In another embodiment of the device, at least one measuring device such as a laser-measuring device, may determine values for the spatial position of at least one individual component. As a result, the spatial positions of the individual components accommodated on the positioning devices may be precisely determined.

In still another embodiment of the device, at least one control and/or regulating unit is provided. The control and/or regulating unit may allow for coordination and control of all positioning devices.

According to another embodiment of the device, a spatial position of at least one positioning device is variable as a function of the position values of the measuring device, by use of the control and/or regulating unit. As a result, the individual components accommodated by the positioning devices may be moved around accordingly by the control and/or regulating unit until the individual components have been matched together to form a section and may be tacked.

In another embodiment of the device, at least one positioning device is arranged in a region of a base surface. An assembly of the device according to one embodiment of the invention may be made simpler such that assembly may take place essentially on just one plane.

In another embodiment of the device, at least one tacking device is provided. This may enable a manual tacking of the joined individual components and/or an at least semiautomatic tacking.

According to one embodiment of the device, a positioning device is designed as a base positioner. The base positioner has a positioning frame with a receptacle for holding an individual component, in particular a lower shell, wherein the positioning frame is accommodated on a transport vehicle. The positioning frame may have at least one positioning unit for positioning on the base surface.

According to one embodiment of the device, a positioning device is designed as a first lateral positioner. The first lateral positioner comprises at least one positioning tower for positioning an individual component, such as a left lateral shell. A positioning device is designed as a second lateral positioner. The second lateral positioner may comprise at least one positioning tower for positioning an individual component, such as a right lateral shell.

According to one embodiment of the device, a guiding element is arranged on the base surface spaced roughly parallel apart to a left longitudinal section side. At least one positioning tower comprises at least one transferring unit, with which at least one positioning tower is transferable on the guiding element. At least one positioning tower comprises at least one retaining arm that may be positioned by an actuator, and that comprises at least one receptacle for accommodating the left lateral shell, which receptacle may be positioned by an actuator.

A guiding element may be arranged on the base surface spaced roughly parallel apart to a right longitudinal section side.

According to one embodiment of the device, at least one positioning tower comprises at least one transferring unit, wherein at least one positioning tower is transferable on the guiding element. According to one embodiment of the device, at least one positioning tower comprises at least one retaining arm that may be positioned by an actuator, and comprises at least one receptacle for accommodating the right lateral shell, wherein the receptacle may be positioned via an actuator.

According to one embodiment of the device, a positioning device is designed as an upper positioner. The upper positioner may comprise a front positioning tower and a back positioning tower in a region of a left longitudinal side as well as in a region of a right longitudinal section side, wherein the front and back positioning towers are fixed in place on the base surface.

According to one embodiment of the device, a traverse may be vertically shifted by actuators is arranged between the front positioning towers. Two carriages may be mounted on the traverse, slidably via actuators, wherein the carriages each comprise a receptacle.

According to one embodiment of the device, the back positioning towers each comprise a retaining arm that may be at least vertically positioned via an actuator and has a receptacle. The receptacles may be at least vertically positioned by using at least one actuator.

According to one embodiment of the device, a retaining frame is accommodated on the receptacles. The retaining frame may comprise at least one retaining unit for the detachable connection of an upper shell.

According to one embodiment of the device, a positioning device is designed as an inner positioner. The inner positioner may comprise a front positioning tower and a back positioning tower in a region of a left longitudinal section side as well as in a region of a right longitudinal section side.

According to one embodiment of the device, a respective guiding element is arranged on the base surface spaced roughly parallel apart from the left and right longitudinal sides.

According to one embodiment, the front positioning towers each have a transferring unit with which the front positioning towers are transferable on the guiding elements. The back positioning towers may be rigidly fixed on the base surface.

According to one embodiment, the front and back positioning towers each comprise a vertically displaceable retaining arm each having a receptacle. The receptacles may be at least vertically positioned by at least one actuator.

According to one embodiment, a retaining frame is accommodated on the receptacles. The retaining frame may have at least one retaining unit for detachably connecting a floor scaffold. According to another embodiment, at least two working platforms are provided.

According to one embodiment, at least one retainer is arranged on the base surface spaced parallel apart from a left longitudinal section side and at least one retainer is arranged on the base surface spaced parallel apart from a right longitudinal section side.

According to one embodiment, the retainers each have a retaining arm for accommodating at least two working planes and pointing toward the section. The working planes may be moveable to the section on the retaining arms.

According to one method, the individual components are tacked together with the lowest possible tackout level sufficient to ensure an adequate inherent rigidity of the section. At least two individual components, such as a lower shell, two lateral shells, an upper shell and a floor scaffold, are positioned to form the section. Two individual components, such as a lower half shell with a floor scaffold and an upper half shell may be positioned to form the section. The procedural sequence may be controlled by an open and/or closed-loop controller.

The spatial positions of the individual components may be determined by a measuring device, such as a laser-measuring device, and may be varied by using several positioning devices until a preset spatial position of the individual components may be reached. In such a spatial position, the individual components may be tacked together into a section and may enable a joining and tacking of different sections such as sections with varying cross sectional geometries and/or cross sectional dimensions and/or linear dimensions out of several individual components for various aircraft types or numerous aircraft type derivatives in one device.

DETAILED DESCRIPTION OF PREFERRED EMBODIMENTS

Figure 1:
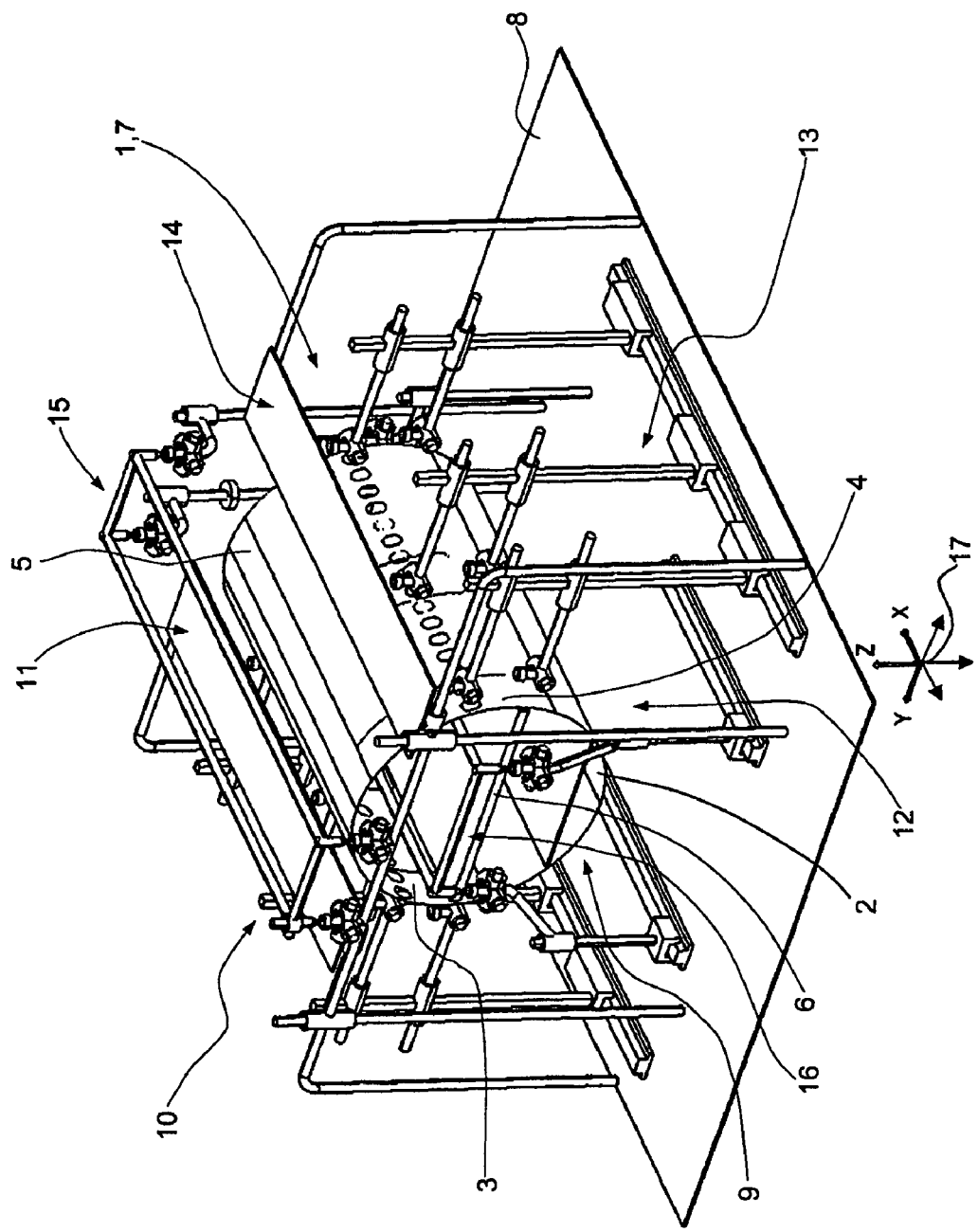
FIG. 1 is a perspective overall view of the device according to one embodiment of the invention.

The same or similar elements are marked with the same reference numbers in the drawings in order to make comparison between the drawings easier.

In FIG. 1, one embodiment of a device is shown in a perspective view with several positioning devices for positioning individual components to join together a section 7. A section 7 formed with several individual components 1, such as a lower shell 2, a left lateral shell 3, a right lateral shell 4, an upper shell 5 and a floor scaffold 6 rests on a positioning device designed as a base positioner, which is known in the art and is not shown in FIG. 1 for the sake of clarity. The base positioner is arranged on a base surface 8 below the section 7. Among other things, the base positioner comprises a positioning rack (also not shown), with an accommodation device for holding and positioning the lower shell 2 relative to the device, and a transportation device. The transportation device may be used to initially move the lower shell 2 into the device for joining the additional individual components 1, such as the left and right lateral shells 3, 4, the upper shell 5 and the floor scaffold 6. After the joined individual components 1 have been partially tacked, the then sufficiently inherently rigid section 7 may be moved out of the device via the transportation device without risk of deformation.

Spaced apart parallel from a left longitudinal section side 9 is another positioning device designed as a first lateral positioner 10 for aligning the left lateral shell 3, as well as a working platform 11. Spaced apart parallel to a right longitudinal section side 12 is another positioning device designed as another, second lateral positioner 13 for aligning the right lateral shell 4, as well as a working platform 14. Located above the section 7 is another positioning device designed as an upper positioner 15 for aligning the upper shell 5. Finally, a positioning device designed as an inner positioner 16 is arranged inside the section 7 for positioning the floor scaffold 6.

Also depicted in the region of the base surface 8 is a coordinate system 17 in order to illustrate the orientations of the x-, y- and z-directions in the space inside the device, to which reference will be drawn as the description continues. The positioning devices may here each be positioned independently from each other at least parallel to the x-direction, y-direction and z-direction. Further, the motion sequences of the positioning devices in the mentioned directions may take place simultaneously and in any combination, even including rotations around any rotational axes arranged within the space.

Two lateral positioners 10, 13, the base positioner (not shown), the upper positioner 15 and the inner positioner 16 may enable a dimensionally independent and, at the same time, precise spatial alignment of the individual components 1 of a section 7. Therefore, the device of FIG. 1 may be used to join a plurality of various sections, such as cross sections with varying cross sectional geometries and/or cross sectional dimensions and/or linear dimensions from corresponding individual components. The device may tack them together manually or semiautomatically after positioning is complete. In one example, the goal is a low tackout level, such that the retention time of the sections inside the device is reduced or minimized.

The individual components 1 may be aligned relative to a lower shell 2 accommodated by the base positioner. If the lower shell 2 is accommodated on the base positioner slightly tilted relative to the base surface 8, for example, the left lateral shell 3, the right lateral shell 4, the upper shell 5 and the floor scaffold 6 may be aligned thereto and simultaneously aligned relative to each other. In this example, all individual components 1 of section 7 are then slightly tilted relative to the base surface 8, but are positioned precisely in relation to each other to form the section 7.

Figure 2:
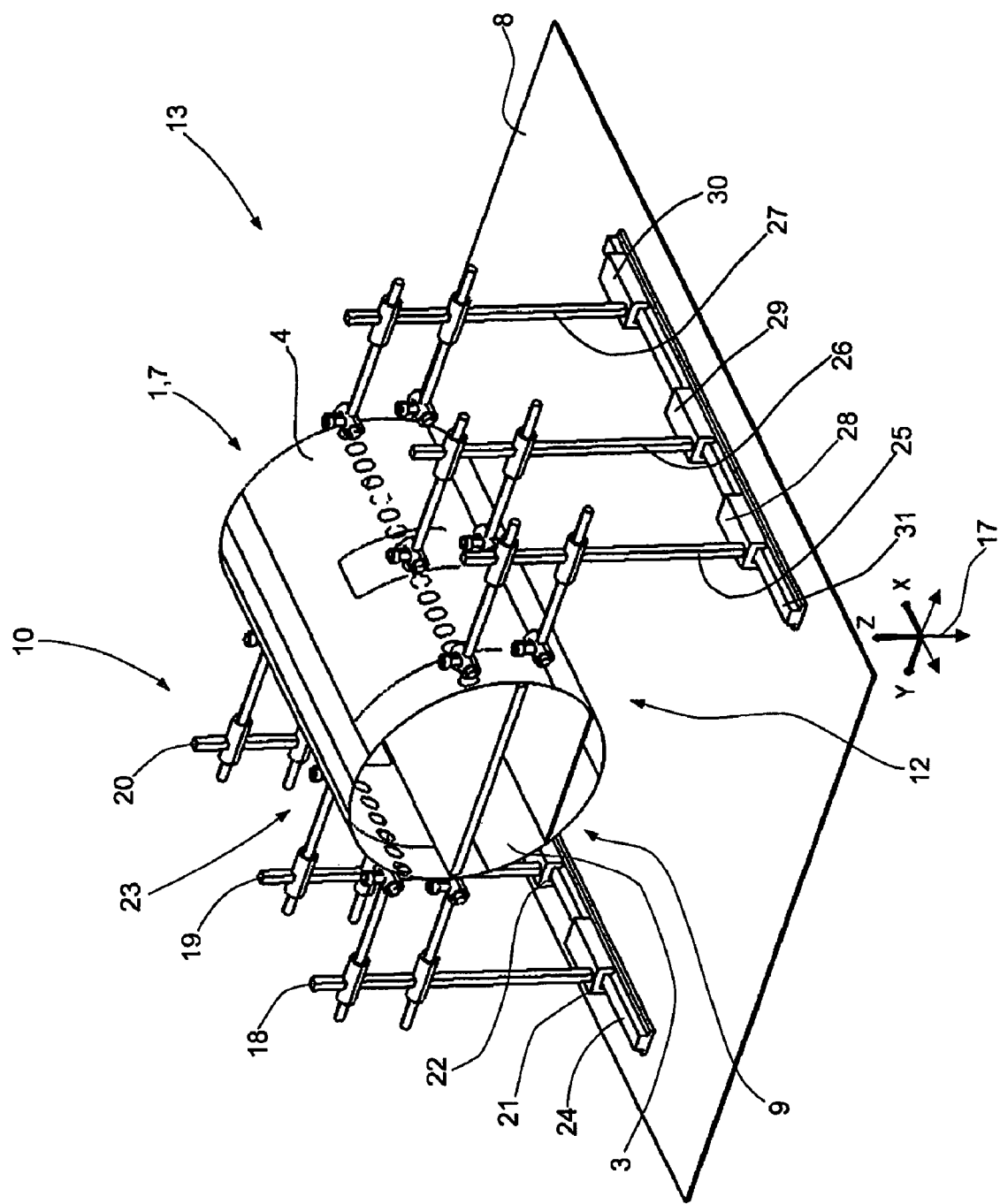
FIG. 2 is a perspective view of a first and second lateral positioner.
Figure 4:
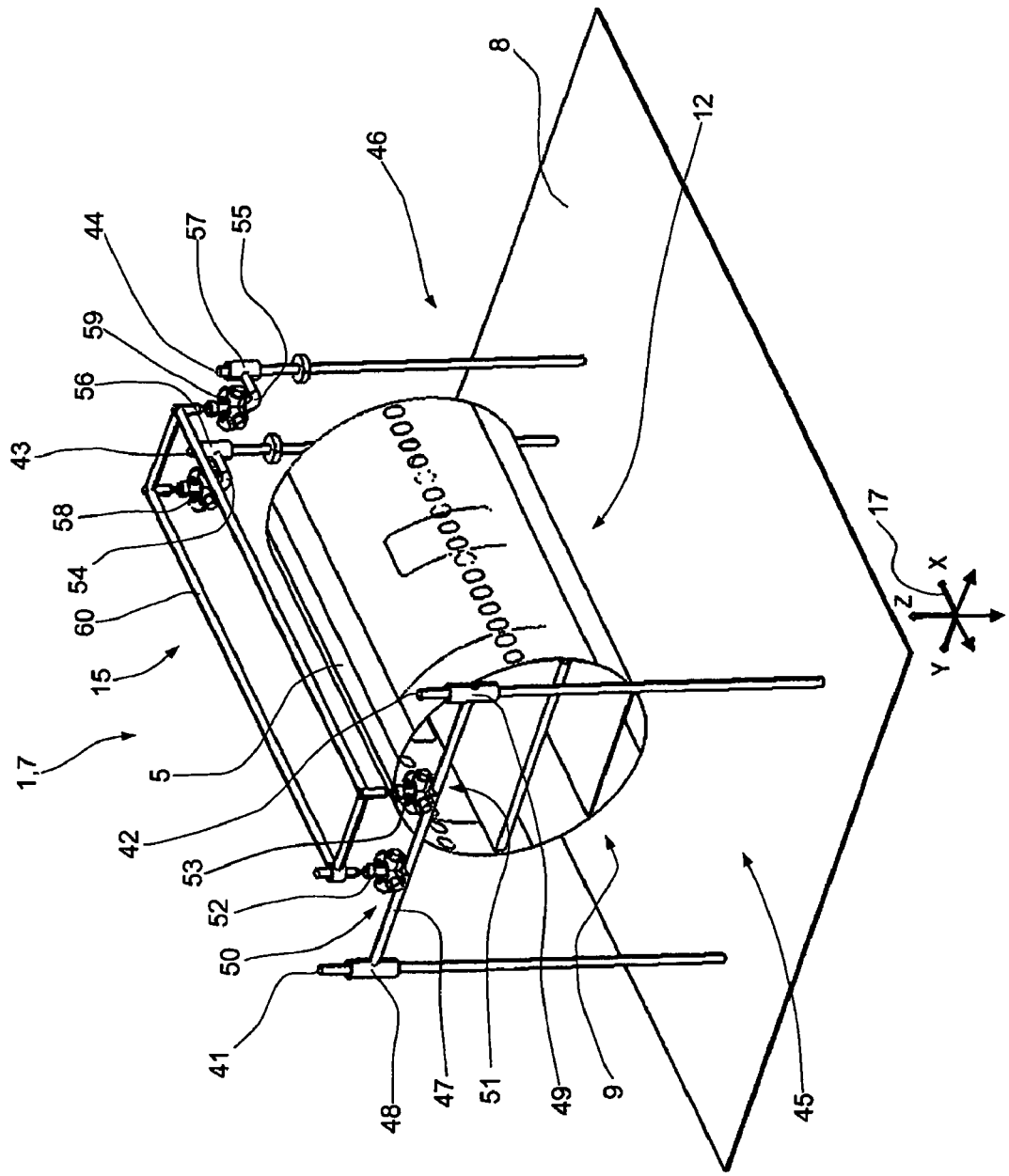
FIG. 4 is a perspective view of an upper positioner.
Figure 6:
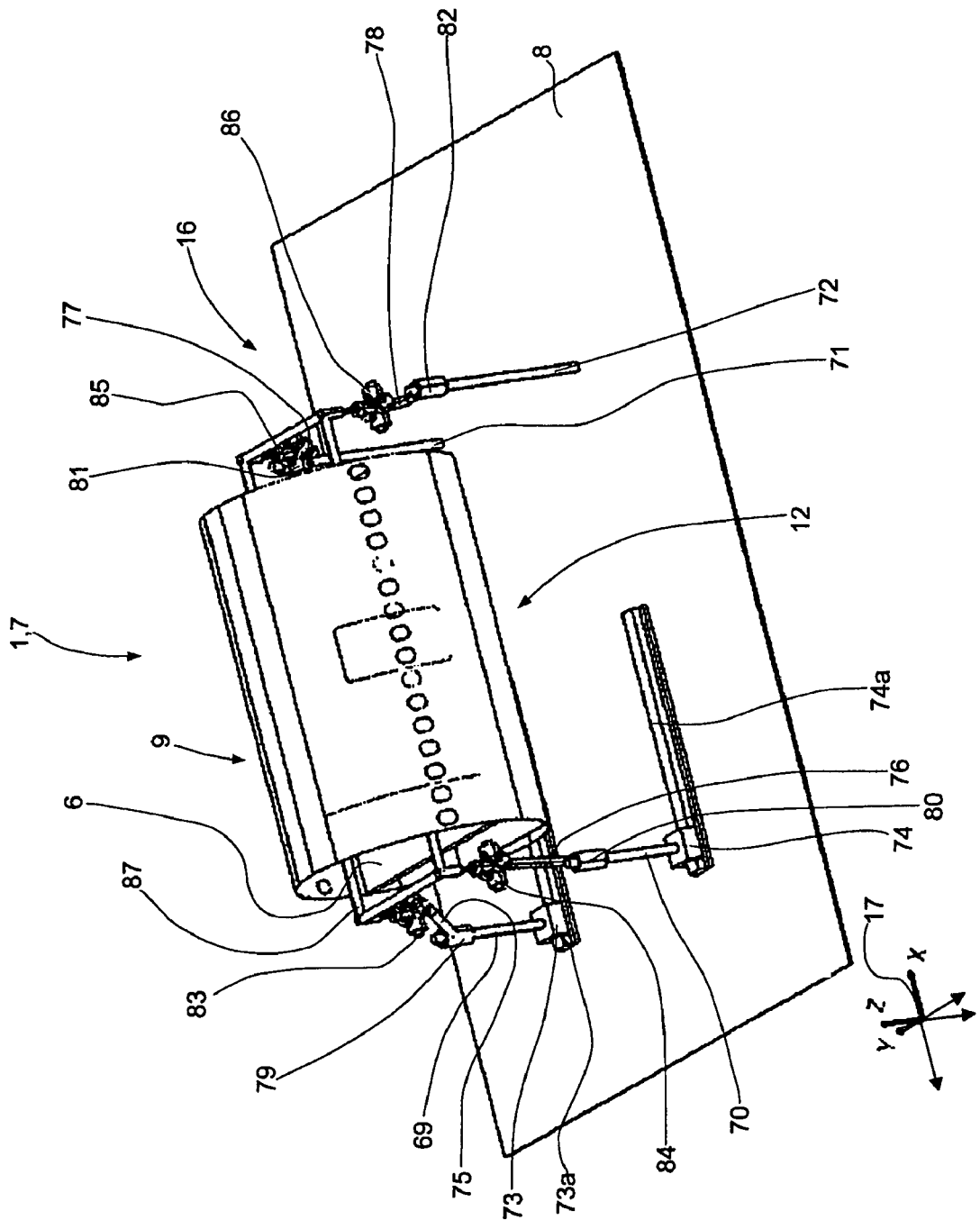
FIG. 6 is a perspective view of the inner positioner.

To provide a better overview, FIGS. 2, 4 and 6 present separate views of the first and second lateral positioner 10, 13, the upper positioner 15 and the inner positioner 16 as examples of components of a device. In FIG. 2, the first and second lateral positioners 10, 13, which are used to position the left and right lateral shells 3, 4. The first and second lateral positioner 10, 13 are situated in the region of the base surface 8 on both sides of the section 7 and/or the individual components 1. Also visible on the base surface 8 is the coordinate system 17 for illustrating the spatial position of the x-, y- and z-directions. The lateral shells 3, 4 are guided to the lateral positioners 10, 13 by using devices not shown. The first lateral positioner 10 for positioning the left lateral shell 3 comprises, among other things, three positioning towers 18, 19, 20 to position the left lateral shell 3. A different number of positioning towers may be used. The positioning towers 18, 19, 20 each have a transferring unit 21, 22, 23, which is arranged on a guiding element 24 spaced apart parallel to the left longitudinal section side 9. The transferring units 22, 23 of the positioning towers 19, 20 are here covered by section 7, as depicted in FIG. 2. The transferring units 21, 22, 23 may be used to move the positioning towers 18, 19, 20 on the guiding element 24 essentially parallel to the left longitudinal section side 9 or in the x direction, thereby positioning them. This allows for alignment of various lateral shells, such as varying length dimensions, by using the first lateral positioner 10.

The second lateral positioner 13 for positioning the right lateral shell 4 comprises the positioning towers 25, 26, 27. The positioning towers 25, 26, 27 each have a transferring unit 28, 29, 30. The transferring units 28, 29, 30 may be used to move the positioning towers 25, 26, 27 independently from each other on guiding element 31, and are again spaced apart roughly parallel to the right longitudinal section axis 12, and/or in the x direction. For example, the guiding elements 24, 31 may be designed as guide rails, on which the transferring units 21, 22, 23 and 28, 29, 30 may be moved independently of each other by actuators (not shown in any greater detail).

Figure 3:
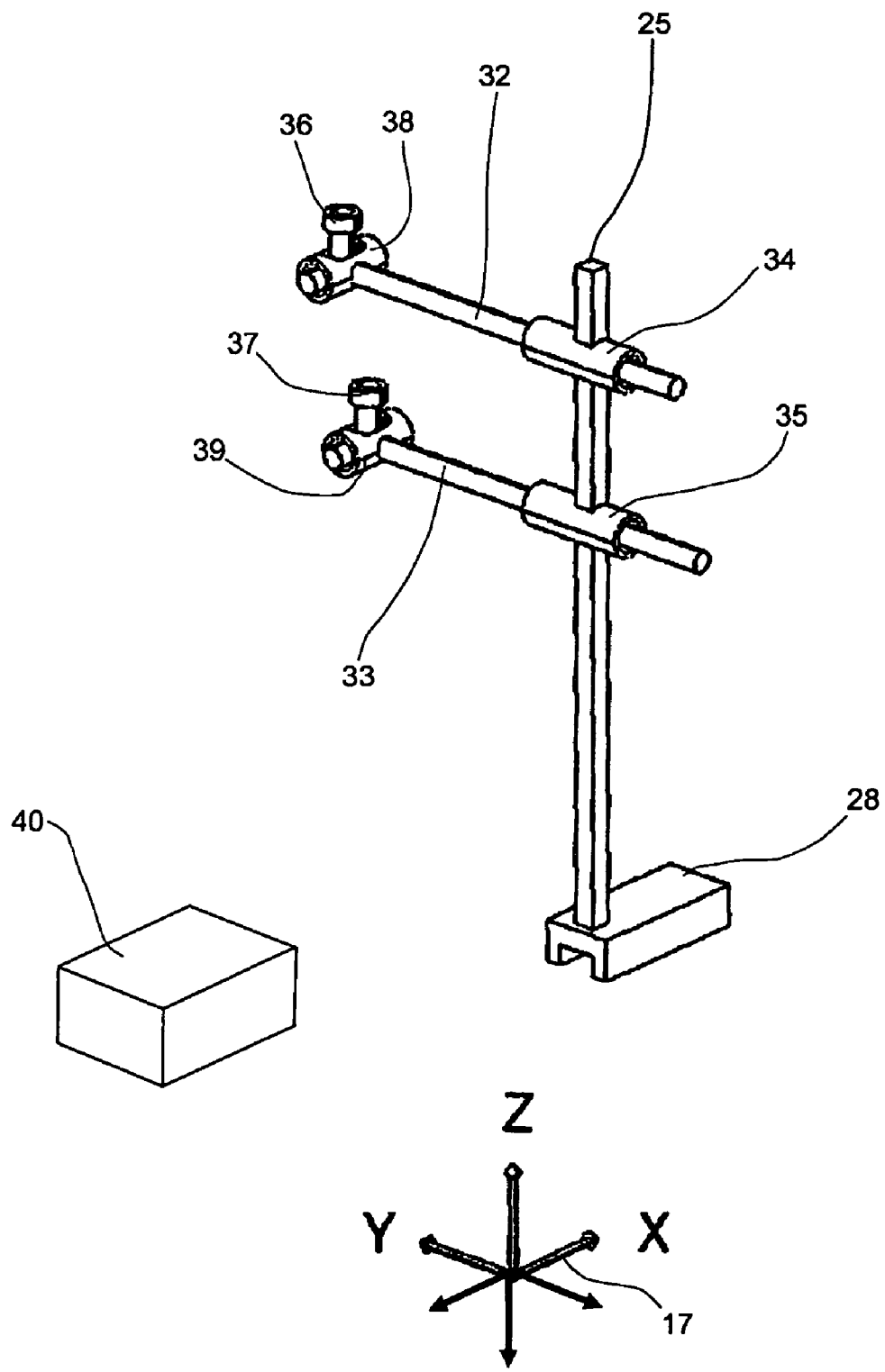
FIG. 3 is a perspective detailed view of a positioning tower.

In FIG. 3, a detailed view of the positioning tower 25 with the transferring unit 28 is depicted. The coordinate system 17 is once again depicted to illustrate the spatial position of the x-, y- and z-directions. The structural design of the positioning tower 25 with all elements described in detail below, in this example, corresponds to the structural design of the remaining positioning towers 18 to 20 as well as 26, 27, and hence is representative for the latter (see in particular FIG. 2). The positioning tower 25 comprises two retaining arms 32, 33. The retaining arms 32, 33 may each be spatially positioned independently of each other in both the y-direction and z-direction via the actuators 34, 35. The retaining arms 32, 33 further comprise receptacles (holding elements) 36, 37 that may be positioned independently of each other in the x-direction via the actuators 38, 39. In addition to the ability to position the positioning tower 25 in the x-direction by shifting the transferring unit 28 on the guiding element 31, the actuators 38, 39 also allow for positioning the receptacles 36, 37 in the x-direction independently of that. The receptacles 36, 37 may be used to accommodate retaining units (not shown) on the lateral shells to be positioned. The positioning towers 18 to 20 along with 26 and 27 not described here in any greater detail comprise the same retaining arms, receptacles and actuators as described above, such that each of these positioning towers 18 to 20 along with 26 and 27 have the same moving capabilities. The movements of the transferring unit 28 and actuators 34, 35, 38, 39 of the positioning tower 25 are monitored and controlled during the process of aligning a lateral shell by an control and/or regulating unit 40. The same holds true for the remaining positioning towers 18 to 20 as well as 26 and 27.

Now referring to FIG. 4, a detailed view of upper positioner 15 arranged above section 7, which is used to position the upper shell 5, is shown. Among other things, the section 7 is composed of the individual components 1. The coordinate system 17 is once again depicted in the region of the base surface to illustrate the x-, y- and z-directions in space. On the base surface 8, two front positioning towers 41, 42 and two back positioning towers 43, 44 are arranged. The front and back positioning towers 41, 42, 43, 44 are rigidly fixed to the base surface 8 in the area of a front and back transverse section side 45, 46. The transverse section sides 45, 46 are spaced roughly transversely apart from the longitudinal section sides 9, 12. The distance between the front positioning towers 41, 42 is greater than the width of the section 7. By contrast, the back positioning towers 43, 44 are spaced apart at a distance less than the width of the section 7. This design is necessary, because once the individual components 1 have been aligned or positioned, and then tacked together, the section 7 is again taken out of the device, travelling between the two positioning towers 41, 42 in the x-direction.

Situated between the front positioning towers 41, 42 is a traverse 47. The actuators 48 and 49 may be used to position the traverse 47 on the front positioning towers 41, 42 vertically or in the z-direction. The traverse 47 carries two carriages 50, 51, which may essentially be shifted in the y-direction by actuators (not shown in any greater detail). The carriages 50, 51 accommodate two receptacles 52, 53. The receptacles 52, 53 may be freely positioned in space at least in the z-direction by using actuators (not shown in greater detail). The back positioning towers 43, 44 each have the retaining arms 54, 55. The retaining arms 54, 55 may be positioned by the actuators 56, 57 on the back positioning towers 43, 44 in vertical direction or in the z-direction. The retaining arms 54, 55 comprise the receptacles 58, 59. The receptacles 58, 59 may be, likely receptacles 52, 53, freely positioned in space in at least a vertical direction or in the z-direction by actuators (not shown in greater detail).

The receptacles 52, 53, 58, 59 detachably accommodate a retaining frame 60 or "presenting frame". The retaining frame 60 is here hinged to the receptacles 52, 53, 58, 59. To this end, the receptacles 52, 53, 58, 59 comprise socket of a ball and socket joint, e.g., ball, conical sockets or the like, which may incorporate correspondingly shaped units arranged on the retaining frame 60, e.g., in the form of balls, cones or the like. The retaining frame 60 is used to move the upper shell 5 into the device by using devices not shown in any greater detail via suitable hoisting devices, e.g., cranes, portal cranes or the like. The "presenting frame" as shown on FIG. 4 comprises retaining units not shown in any greater detail for accommodating the upper shell 5. In FIG. 4, the retaining frame 60 has a rectangular shape. However, the retaining frame 60 may also of be of any geometric shape.

Figure 5:
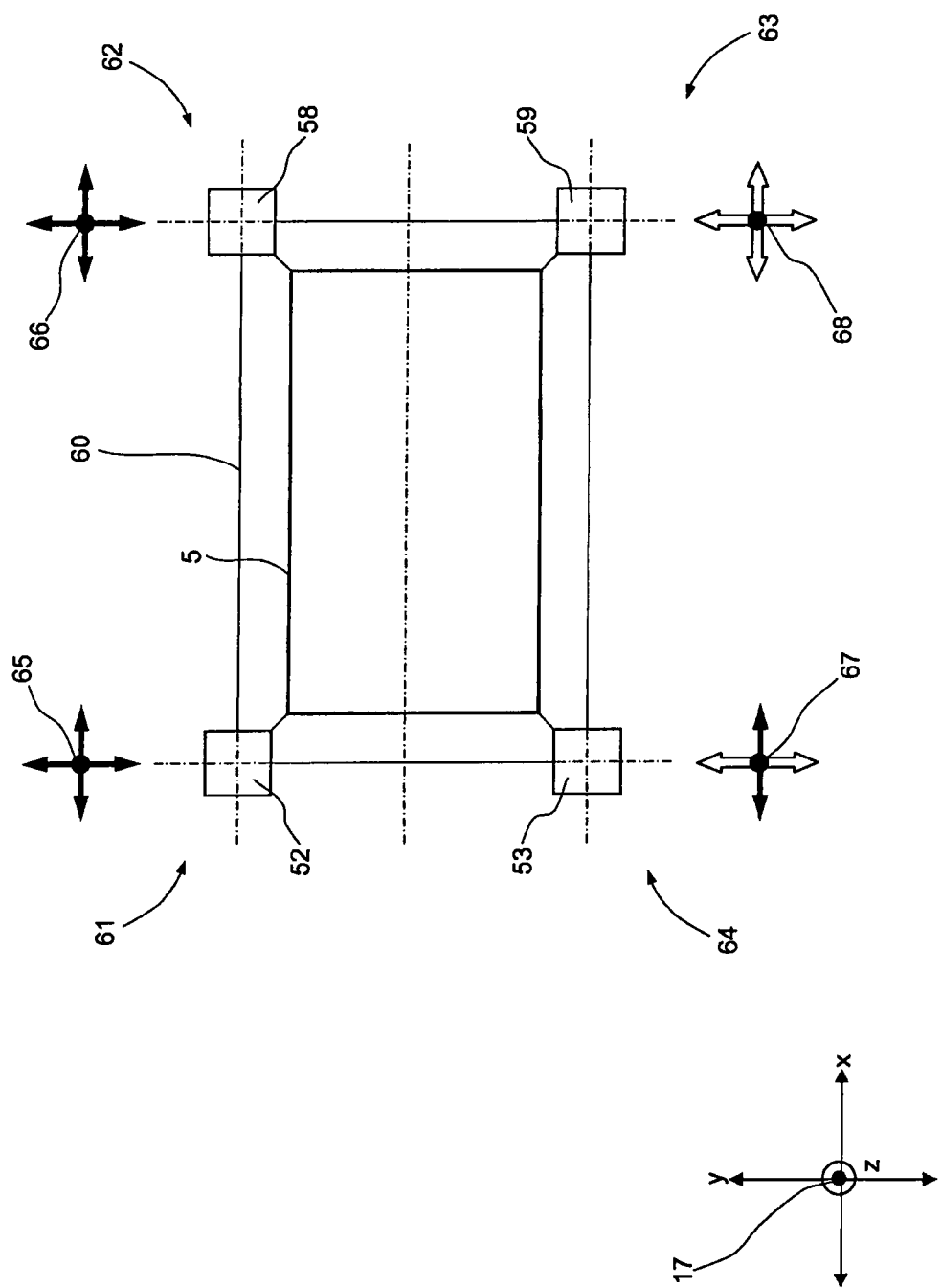
FIG. 5 is a diagrammatic view of the possible movements of the upper positioner and an inner positioner.

Now referring to FIG. 5, a diagrammatic view of movement capabilities of the receptacles 52, 53, 58, 59 of the upper positioner 15 for positioning the retaining frame 60 with the upper shell 5 accommodated thereupon is shown. These movement capabilities accommodate the movement capabilities of the floor scaffold, which corresponds to holding elements of the inner positioner 16. The coordinate system 17 is again shown to more clearly illustrate the spatial orientation of the x-, y- and z-directions. The upper shell 5 is accommodated by and/or detachably attached to the retaining frame 60 via receptacles not described in any greater detail. The retaining frame 60 itself is accommodated and/or mounted in four corner areas 61 to 64 in the receptacles 52, 53 as well as 58, 59. The supplementary coordinate systems 65, 66, 67, 68 symbolize the movement capabilities and/or the free and driven axes of the receptacles 52, 53, 58, 59 in space.

The black double arrows in the coordinate systems 65 to 68 denote that the respective receptacles 52, 53, 58, 59 may move in the respective spatial direction parallel to the directions of the coordinate system 17, for example, the x-, y-directions. The receptacles 52, 53, 58 are not driven and/or positionable by actuators in the direction of the black double arrows, and are hence freely movable. The black, solid circles and/or points stand for a movement capability and/or positioning capability of receptacles 52, 53, 58, 59 in the z-direction imparted by the actuators (not shown in any greater detail). That is, that the receptacles 52, 53, 58, 59 may be actively positioned by actuators in the z-direction.

The white double arrows stand for a movement capability of the receptacles 53, 59 imparted by actuators. In other words, at least the receptacles 53, 59 in the direction of the white double arrows may be actively positioned and are driven by actuators not shown in any greater detail. By contrast, the receptacles 52 and 58 "float" after the movements of the receptacles 53, 59, except for the movement capability in the z-direction imparted by actuators, such that the retaining frame 60 moves accordingly. Therefore, the upper shell 5 is positioned by the retaining frame 60 essentially via the receptacle 59 that may be actively positioned in all spatial directions (x-, y- and z-directions) in the depicted embodiment, as well as via the receptacle 53 that may be actively positioned in at least the y- and z-direction. By contrast, the receptacles 52 and 58 passively follow the movements imparted by the receptacles 53, 59, except for the positioning capability in the z-direction existing independently of this.

In a departure from the depicted configuration of receptacles 52, 53, 58, 59, all receptacles 52, 53, 58, 59 may alternatively execute any movements in the x-, y- and z-direction independently of each other. For example, it is possible for receptacles 52, 53, 58, 59 to be respectively positioned by actuators independently of each other in the x-, y- and z-directions of space, but this would require a high regulating outlay.

In order to realize the movement capabilities of the retaining frame depicted in FIG. 5, the receptacles 52, 58 are designed as lower supporting plates designed to be vertically displaceable via an actuator. The lower supporting plates, preferably furnished with a sliding coating, balls or other friction-reducing means, are respectively matched with upper supporting plates jointly fixed with the mounting frame 60 in the corner regions 61, 62. The upper supporting plates may be freely shifted horizontally, such that they "float" after all movements imparted and/or prescribed by the mounting frame 60 in the x- and y-directions. Despite this fact, the mounting frame 60 may be freely positioned in space via the actuators allocated to the receptacles 52, 58, at least in the z-direction. The receptacle 59 may be built by three respective sequentially arranged actuators respectively acting in the x-, y- and z-directions, wherein the actuator acting in the z direction is jointly fixed with the retaining frame 60 in the corner area 63.

The receptacle 53 may comprise known slideways, e.g., linear guides, dovetail guides, transferring tables, compound tables (Kreuztische) or the like.

The positioning system for the retaining frame 60 allows for positioning with minimal control outlay. In addition, the upper positioner 15 is largely prevented from jamming by the actuators moving in opposite directions in the same spatial direction.

Now referring to FIG. 6, a perspective view of the inner positioner 16, which is used to position the floor scaffold 6 inside the section 7 formed from the individual components 1 is shown. The coordinate system 17 is again used to illustrate the x-, y- and z-directions in space.

Among other things, the inner positioner 16 comprises two front positioning towers 69, 70 and two back positioning towers 71, 72. The front positioning towers 69, 70 and back positioning towers 71, 27 are each uniformly spaced apart, substantially parallel to the left or right longitudinal section side 9, 12. The front positioning towers 69, 70 are displaceable in the x direction via transferring units 73, 74 on the guiding elements 73a, 74a. The back positioning towers 71, 72 are rigidly, i.e., stationarily, arranged on the base surface 8. The front and back positioning towers 69 to 72 each comprise retaining arms 75 to 78. The retaining arms 75 to 78 are displaceable vertically and/or in the z-direction via the actuators 79 to 82 on the front and back positioning towers 69 to 72. In addition, the front retaining arms 75, 76 are formed such they are pivotable around the front positioning towers 69, 70 and/or around a high axis running roughly parallel to the z-direction (not shown). The end regions of the retaining arms 75 to 78 each comprise respectively 83 to 86 for accommodating the retaining frame 87 and/or the "presenting frame". The retaining frame 87, in this example, is hinged to the 83 to 86. To achieve this end, the receptacles 83 to 86 may have sockets of a ball and socket joint, such as ball, conical sockets or the like, which may incorporate correspondingly shaped units arranged on the retaining frame 87, e.g., in the form of balls, cones or the like. A retaining frame 87 also comprises retaining units (not shown) for connecting the floor scaffold 6. The retaining arms 75, 76 are swivelled out and/or lowered to clock the partially tacked section 1.

The receptacles 83 to 86 may be positioned via actuators (not shown in any greater detail) in the same way as the receptacles 52, 53, 58, 59 (see FIG. 4, upper positioner 15 for positioning the upper shell 5). The retaining frame 87 with floor scaffold 6 connected thereto is positioned in the same way as the retaining frame 60 with the upper shell 5 attached thereto. In this respect, reference may be made to the statements made further above within the framework of the description to FIGS. 4 and 5 with respect to the movement capabilities of the receptacles 83 to 86. As with the retaining frame 60, the retaining frame 87 may be detachably accommodated in the receptacles 83 to 86 to enable the incorporation of the floor scaffold 6 in the section 7.

Figure 7:
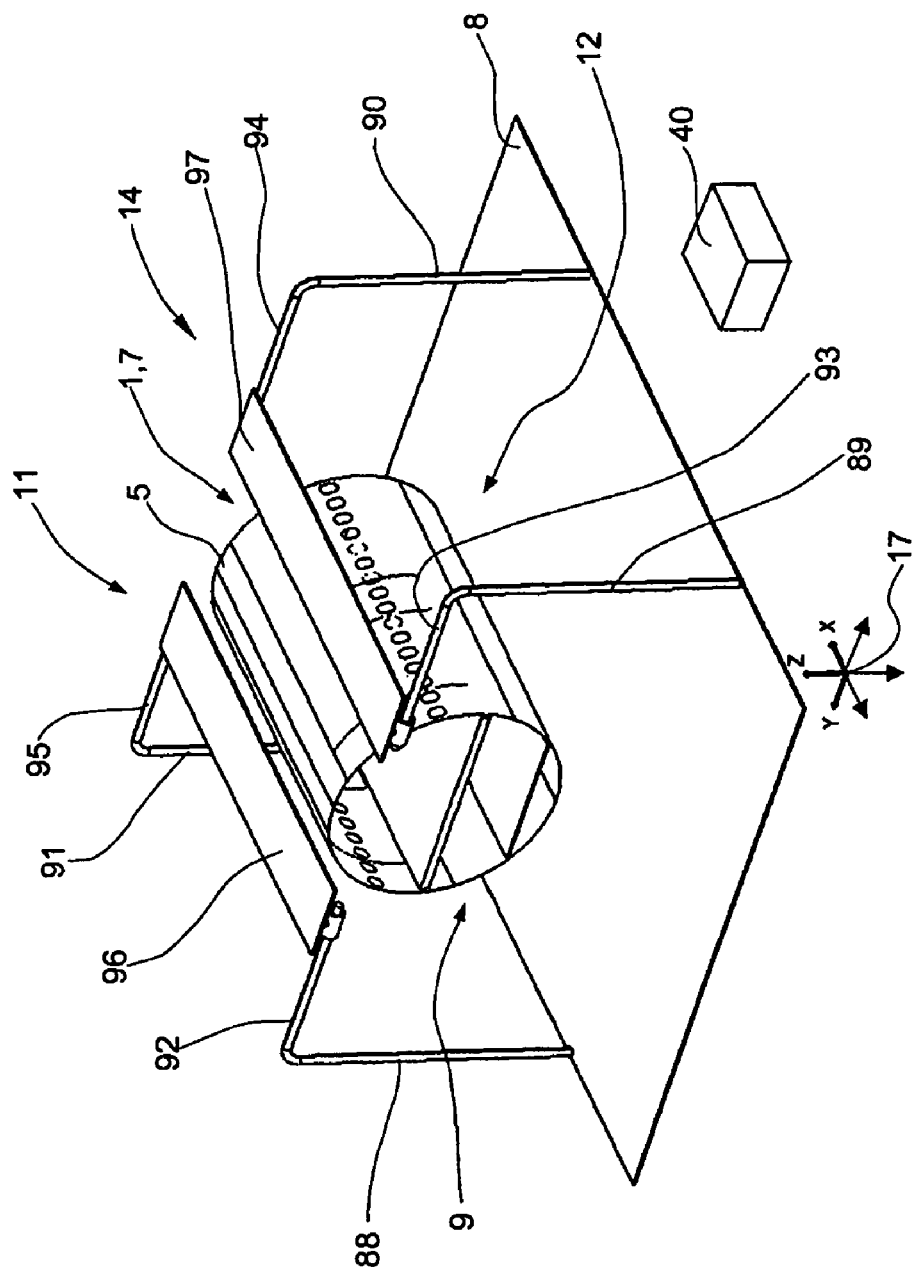
FIG. 7 is a perspective view of two working platforms.

In FIG. 7, a perspective view of working platforms 11 and 14 arranged on both sides of the section 7 is depicted. The working platforms 11, 14 are spaced outwardly roughly parallel apart relative to the first and second longitudinal section side 9, 12 in the region of the upper shell 5 of the section 7 formed out of the individual components 1. The coordinate system 17 is depicted in the area of the base surface 8 to illustrate the x-, y- and z-directions in space. Among other things, the working platforms 11, 14 comprise four retainers 88 to 91, which are outwardly spaced apart parallel to the first and second longitudinal section side 9, 12 of the section 7 and which are stationarily arranged on the base surface 8. A respective retaining arm 92 to 95 is arranged at the upper ends of the retainers 88 to 91. A first working plane 96 is situated on the retaining arms 92, 95. A second working plane 97 is correspondingly arranged on the retaining arms 93, 94. The first working plane and second working plane 96, 97 are designed to be displaceable in the y-direction on the retaining arms 92 to 95. This allows for adjustment of the working platforms 11, 14 to sections with particularly different cross sectional dimensions.

The broad range of movement capabilities for the base positioner, the first and second lateral positioners 10, 13, the positioning towers 18 to 20, 25 to 27, the upper positioner 15 and the inner positioner 16 in the x-, y- and z-directions as shown on FIG. 1, 2 enable a largely size-independent alignment of individual components 1 for joining sections 7 with particularly different cross sectional geometries and/or cross sectional dimensions and/or linear dimensions. The movement of all actuators is here monitored and coordinated via the control and/or regulating unit (open and/or closed-loop controller) 40. In addition, the device comprises at least one measuring device (not shown), such as at least one laser-measuring device. The measuring device may be used to determine the exact spatial positions of the individual components 1, for example, such that the open and/or closed-loop controller 40 may join the individual components 1 to form a tackable section 7 via the correspondingly coordinate activation of the actuators.

If the laser measuring device is designed as a so-called "laser tracker," for example, optical markings are affixed to the individual components 1, such that the laser tracker may detect to determine their precise position in space. As an alternative, a camera system may also be used to determine the respective positions of the individual components 1 in space. The two or three-dimensional images provided by the camera system may then be evaluated by the open and/or closed-loop controller 40 to determine the respective spatial position 1 of the individual components 1.

After the section 7 has been joined, the individual components 1 are finally tacked together. They are tacked together here with a minimal tackout level that still does just permit the transport of section 7 without the danger of deformations. Tacking may here take place both manually and at least semi-automatically, by using a tacking device (not shown). Such a tacking device is well-known in the art.

All actuators may be designed as a rack and pinion drive or spindle drive, for example. As an alternative, hydraulic and/or pneumatic cylinders may also be used. Known measuring procedures are here used to determine the spatial positions taken by the respective positioning devices, such as the base positioner, the first and second lateral positioners 10, 13, the upper positioner 15, the inner positioner 16 and the working platforms 11, 14, e.g., laser and/or camera measuring systems, GPS positioning systems ("indoor" GPS positioning systems) or other positioning systems. The device according to one embodiment of the invention makes it possible to join and tack various types of sections with particularly different cross sectional geometries and/or cross sectional dimensions and/or linear dimensions. (e.g., sections used in the construction of different aircraft types, and/or the construction of aircraft type derivatives.)

Figure 8:
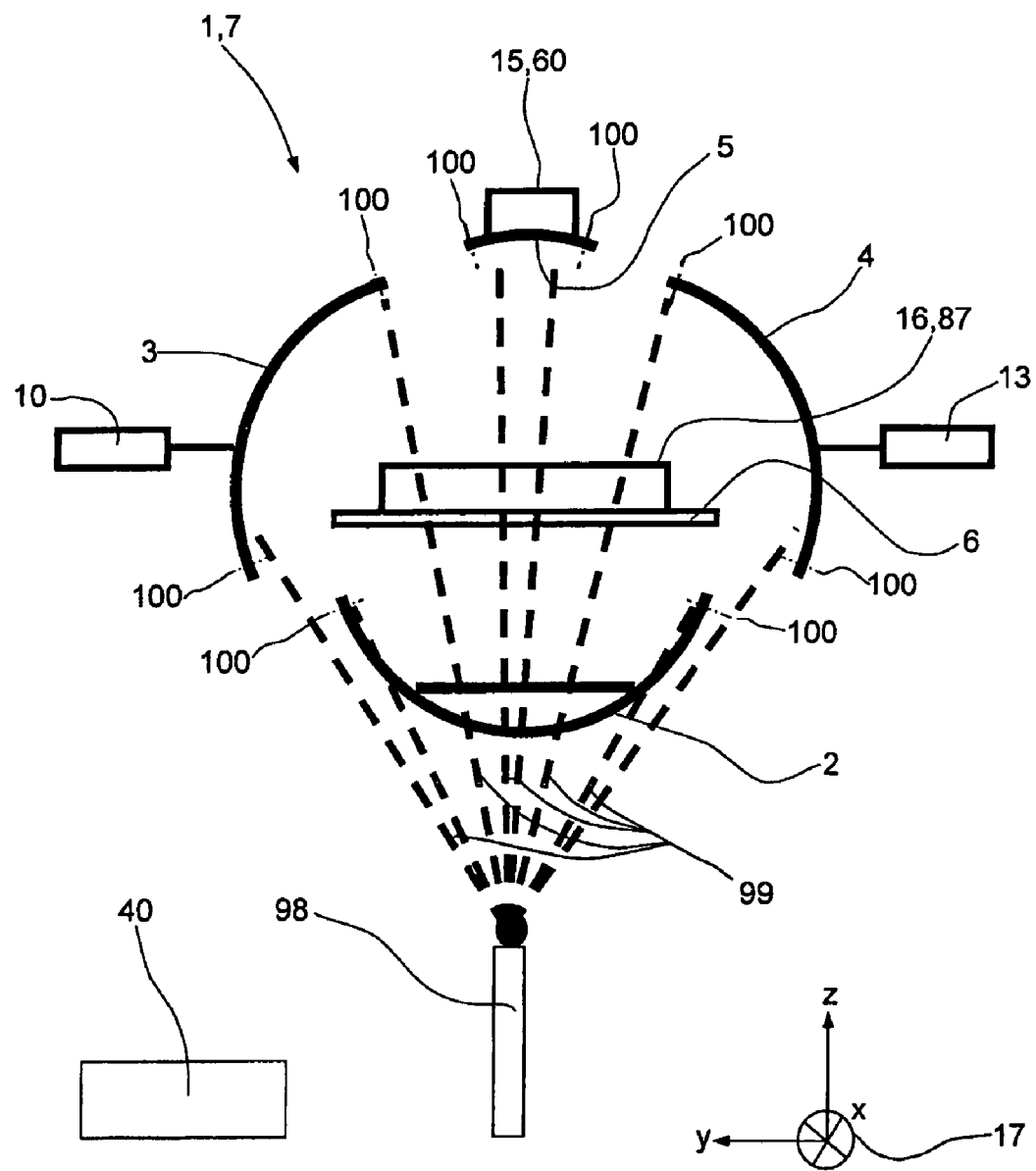
FIGS. 8, 9 are the procedural sequence according to one embodiment of the invention for joining individual components to form a section.
Figure 9:
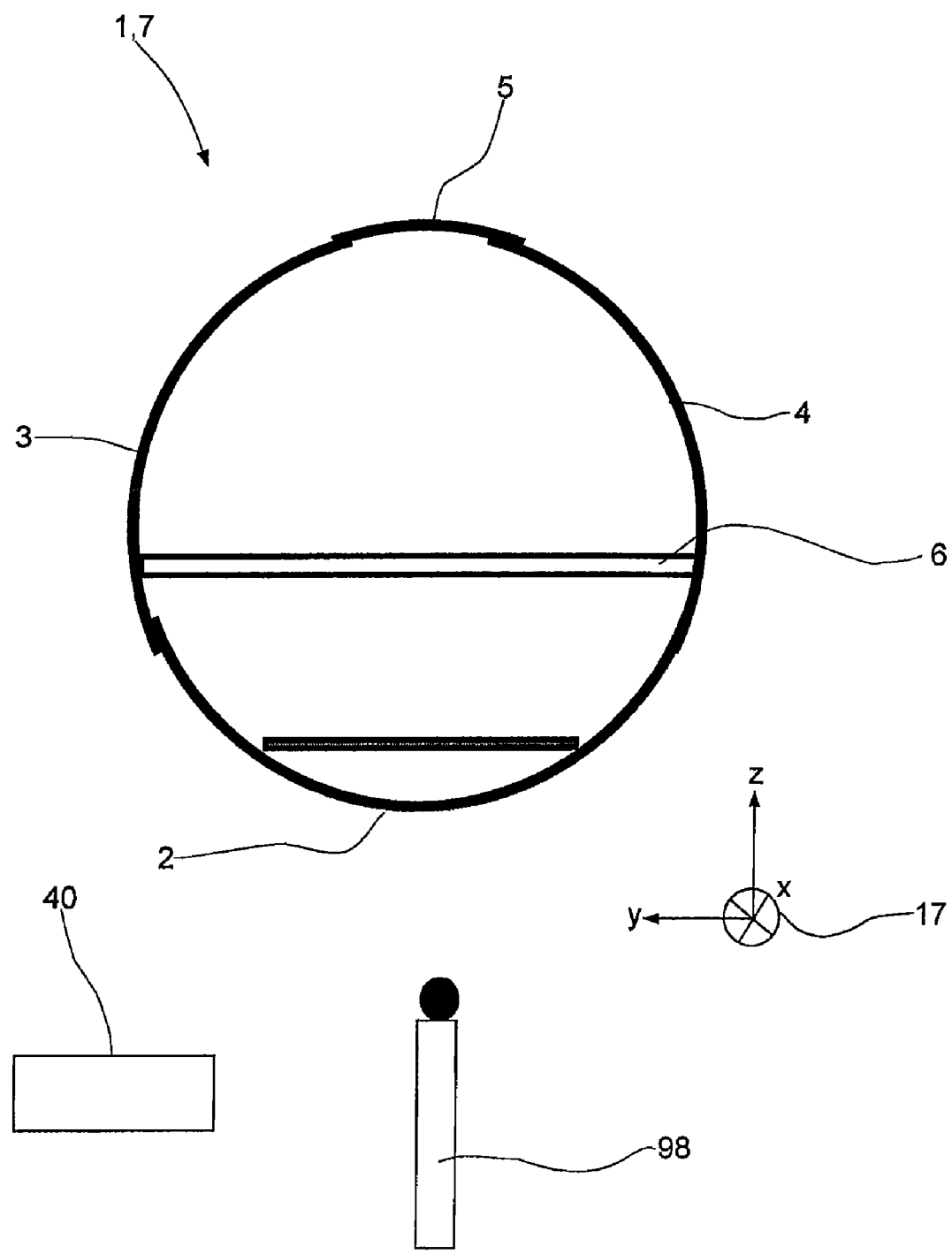

FIGS. 8 and 9 diagrammatically illustrate the sequence of the method according to one embodiment of the invention for joining individual components in order to form a section, in particular for aircraft. In this regard, reference will simultaneously be made below to FIGS. 8 and 9. Section 7 is fabricated out of the individual components 1 in the form of the lower shell 2, the left lateral shell 3, the right lateral shell 4, the upper shell 5 as well as the floor scaffold 6.

The drawing in FIG. 8 shows the individual components 1 in a base position roughly corresponding to a position in which the individual components 1 are initially accommodated by the positioning devices in the form of the base positioner, the first and second lateral positioners 10, 13, the upper positioner 15 and the inner positioners 16. The spatial directions are illustrated both in FIG. 8 and FIG. 9 by the coordinate system 17. The individual components 1 are brought to these positioning devices by using devices (not shown), for example, hoisting devices, that may include cranes, portal cranes or the like. The current actual spatial positions of the individual components 1 are initially determined by laser beams 99 using a suitable measuring device, such as a laser measuring device 98, a GPS positioning system ("indoor" GPS positioning system) and/or camera system. The measured positional values determined in this way are then relayed to the open and/or closed-loop controller 40 for evaluation. The individual components 1 have markings 100 suitable for ascertaining position with the laser beams 99, e.g., reflectors or the like. As an alternative, the spatial positions of the individual components 1 may be determined using a camera system, which is geared toward characteristic features of the individual components 1 to determine the position, e.g., body edges, component openings, reinforced areas, attachment elements or the like.

If the initial actual spatial positions of the individual components 1 have been determined by the open and/or closed-loop controller 40, the first and second lateral positioners 10, 13, the upper positioner 15 and the inner positioner 16 are moved and/or positioned relative to each other by the open and/or closed-loop controller 40 until the spatial positions of the individual components 1 reflect a desired state. The actual spatial positions of the individual components 1 is continuously monitored and/or updated by the open and/or closed-loop controller 40 during the entire moving process. In the desired state, the individual components 1 generally form a self-contained and tackable section 7 (see FIG. 9). The desired state to be achieved via the method according to one embodiment of the invention is defined by mathematical models filed in the open and/or closed-loop controller 40. The desired state to be reached with regard to the spatial positions of the individual components 1 is illustrated in FIG. 9. The lower shell 2, the left lateral shell 3, the right lateral shell 4, the upper shell 5 along with the floor scaffold 6 form a self-contained section 7, which may be tacked together for purposes of temporary fixation. The position of the base positioner and the lower shell 2 accommodated by it remains unchanged relative to the device according to one embodiment of the invention and/or the base surface 8 for the entire process.

The individual components 1 in their final position as shown on FIG. 9 may then be tacked together, either manually, or at least semiautomatically using a tacking device (not shown in greater detail). The process, in one example, requires that the individual components 1 be tacked together, such that the individual components 1 are prevented from shifting against each other in an undefined fashion and/or falling apart after the positioning devices have been removed. Tacking preferably takes place at a minimal tackout level, such that the section 7 may be moved from the device to subsequent workstations and/or production areas after tacked together without the danger of mechanical deformations.

As an alternative, the method according to one embodiment of the invention may be used to align, join and tack together a section out of two shells ("half-shell construction"), for example, instead of four shells ("quarter-shell construction") and a separate floor scaffold as described above, wherein one half-shell then comprises the floor scaffold.

Finally, the procedural sequence will be shown chronologically for purposes of better illustration (see in particular FIG. 8). The lateral shells 3, 4 are initially incorporated into the device by using devices (not shown), accommodated by the lateral positioners 10, 13 and returned to a parked position via the lateral positioners 10, 13. A lower shell 2 is then incorporated into the device and aligned via the base positioner (not shown). The floor scaffold 6 detachably accommodated on the retaining frame 87 is thereafter incorporated into the section 7. After that, the floor scaffold 6 is aligned by the inner positioner 16 in relation to the lower shell 2. Subsequently, the lateral shells 3, 4 are aligned via the lateral positioners 10, 13, controlled by the open and/or closed-loop controller 40. The entire positioning process may be fully automated or controlled manually at least in part, such that necessary corrections may be introduced as needed, e.g., given size deviations of individual components 1. This is followed by the primarily manual tacking of individual components 1, for example, the lower shell 2, the lateral shells 3, 4, as well as the floor scaffold 6. After this procedural step, the retaining frame 87 used to accommodate and position the floor scaffold 6 may be removed from the section 7. In this stage of the process, an inner platform not shown in the figures for purposes of improved clarity is transported into the section 7 by using a hoisting device, a crane, a portal crane or the like. The inner platform is here used in particular for performing manual tacking operations in the area of the upper shell 5 yet to be positioned and tacked. The inner platform is here preferably accommodated, cantilevered (freikragend), in the region of a transverse section side of the section 7. The upper shell 5 accommodated in the retaining frame 60 may be placed on the two lateral shells and aligned relative to the section 7 by using the upper positioner 15. The upper shell 5 may then be tacked at least in part manually with the lateral shells 3, 4 from the inner platform with a minimal tackout level. As a result, the entire section 7 is tacked in an intrinsically rigid manner with a minimal tackout level.

All positioning devices except for the base positioner are then detached from the individual components 1 and returned and/or brought back to their respective parked position. At last, the inner platform is taken out of the device with a hoisting device. The entire section 1 here rests on the positioning frame (not shown) of the base positioner, and is transported out of the device in a longitudinal direction and/or parallel to the x-direction via the transporting device of the base positioner. All transferring processes of the positioning devices are controlled and monitored by the open and/or closed-loop controller 40. The device is then ready to accommodate the next individual components, and to align, join and tack them together to form another, new section.

It should be noted that the terms "comprising" and "include" do not exclude other elements or steps and the "a" or "an" does not exclude a plurality. Also elements described in association with different embodiments and/or aspects may be combined. It should also be noted that reference signs in the claims shall not be construed as limiting the scope of the claims.

REFERENCE LIST

1 Individual components
2 Lower shell
3 Left lateral shell
4 Right lateral shell
5 Upper shell
6 Floor scaffold
7 Section
8 Base surface
9 Left longitudinal section side
10 First lateral positioner
11 Working platform
12 Right longitudinal section side
13 Second lateral positioner
14 Working platform
15 Upper positioner
16 Inner positioner
17 Coordinate system
18 Positioning tower
19 Positioning tower
20 Positioning tower
21 Transferring unit
22 Transferring unit
23 Transferring unit
24 Guiding element
25 Positioning tower
26 Positioning tower
27 Positioning tower
28 Transferring unit
29 Transferring unit
30 Transferring unit
31 Guiding element
32 Retaining arm
33 Retaining arm
34 Actuator
35 Actuator
36 Receptacle
37 Receptacle
38 Actuator
39 Actuator
40 Open and/or closed-loop controller
41 Front positioning tower
42 Front positioning tower
43 Back positioning tower
44 Back positioning tower
45 Front transverse section side
46 Back transverse section side
47 Traverse
48 Actuator
49 Actuator
50 Carriage
51 Carriage
52 Receptacle 53 Receptacle
54 Retaining arm
55 Retaining arm
56 Actuator
57 Actuator
58 Receptacle
59 Receptacle
60 Retaining frame
61 Corner area
62 Corner area
63 Corner area
64 Corner area
65 Coordinate system
66 Coordinate system
67 Coordinate system
68 Coordinate system
69 Front positioning tower
70 Front positioning tower
71 Back positioning tower
72 Back positioning tower
73 Transferring unit
73a Guiding element
74 Transferring unit
74a Guiding element
75 Retaining arm
76 Retaining arm
77 Retaining arm
78 Retaining arm
79 Actuator
80 Actuator
81 Actuator
82 Actuator
83 Receptacle
84 Receptacle
85 Receptacle
86 Receptacle
87 Retaining frame
88 Retainer
89 Retainer
90 Retainer
91 Retainer
92 Retaining arm
93 Retaining arm
94 Retaining arm
95 Retaining arm
96 Working plane
97 Working plane
98 Laser measuring device
99 Laser beam
100 Marking

What is claimed:

1. A device for joining and tacking a plurality of individual components independently of shape, size or both shape and size to form inherently rigid, transportable sections for an aircraft fuselage, wherein the device comprises:
a base surface;
a plurality of positioning devices, a first of the plurality of positioning devices is an upper positioner comprised of two front positioning towers and two back positioning towers; a second of the plurality of positioning devices is an inner positioner comprised of two front positioning towers and two back positioning towers, and the plurality of positioning devices are adapted such that the individual components of an aircraft fuselage barrel section are spatially positionable relative to each other independently of shape, size, or both shape and size by using the plurality of positioning devices, wherein one of the plurality of positioning devices is designed as a first lateral positioner for positioning an independent aircraft fuselage lateral shell, wherein the first lateral positioner comprises at least one positioning tower and at least one transferring unit, and the transferring unit is adapted to transfer the at least one positioning tower on a guiding element, wherein the guiding element is arranged on the base surface and is spaced substantially apart from a longitudinal section side of the independent aircraft fuselage lateral shell.

2. The device according to claim 1, further comprising:
at least one laser measuring device,
wherein the at least one laser measuring device is adapted to determine spatial positional values for at least one of the plurality of individual components.

3. The device according to claim 1, further comprising:
a controller selected from the group of controllers consisting of an open-loop controller, a closed-loop controller and both an open-loop controller and a closed-loop controller.

4. The device according to claim 3, wherein the controller includes both an open loop controller and a closed controller.

5. The device according to claim 3, further comprising:
at least one laser measuring device, wherein the at least one laser measuring device is adapted to determine spatial positional values for at least one of the plurality of individual components, and wherein the controller is adapted such that a spatial position of at least one of the plurality of positioning devices is variable as a function of the spatial positional values determined by the at least one laser measuring device.

6. The device according to claim 1, further comprising:
at least one tacking device.

7. The device according to claim 1,
wherein one of the plurality of positioning devices is designed as a base positioner.

8. The device according to claim 7, wherein the base positioner comprises:
a positioning frame with a receptacle, and
a transport unit,
wherein the positioning frame is accommodated on the transport unit, and
wherein the receptacle is adapted to hold an aircraft fuselage lower shell.

9. The device according to claim 1,
wherein the at least one positioning tower of the first lateral positioner comprises at least one retaining arm, the retaining arm comprising at least one receptacle for accommodating an independent aircraft fuselage lateral shell, wherein the retaining arm is positionable by a first actuator, and the receptacle is positionable by a second actuator.

10. The device according to claim 1, wherein one of the plurality of positioning devices is designed as a second lateral positioner.

11. The device according to claim 10, wherein the second lateral positioner comprises at least one positioning tower for positioning another one of the plurality of individual components of an aircraft fuselage.

12. The device according to claim 11 wherein another guiding element is arranged on the base surface spaced apart from a longitudinal section side of another independent aircraft fuselage lateral shell on an opposite side from the first lateral positioner.

13. The device according to claim 12, wherein the second lateral positioner comprises:

at least one transferring unit adapted to transfer the at least one positioning tower of the second lateral positioner on the another guiding element.

14. The device according to claim 13, wherein the at least one positioning tower of the second lateral positioner comprises at least one retaining arm, the at least one retaining arm comprising at least one receptacle, wherein the at least one retaining arm of the second lateral positioner is positionable by a third actuator and the at least one receptacle of the second lateral positioner is positionable by a fourth actuator.

15. The device according to claim 1,
wherein one of the two front positioning towers of the upper positioner or the inner positioner and one of the two back positioning towers of the upper positioner or the inner positioner are arranged in a region of a longitudinal aircraft fuselage section side,
wherein the other one of the two front positioning towers of the upper positioner and the other one of the two back positioning towers of the upper positioner or the inner positioner are in a region of an opposite side of the one of the two front positioning towers of the upper positioner or the inner positioner and one of the two back positioning towers of the upper positioner or the inner positioned, and
wherein the front and back positioning towers of the upper positioner or the inner positioner are stationary and fixed in place on the base surface.

16. The device according to claim 15, further comprising:
a traverse, wherein the traverse is arranged between the two front positioning towers of either the upper positioner or the inner positioner, and the traverse is adapted such that the traverse is capable of being vertically displaced by actuators.

17. The device according to claim 15, wherein the two back positioning towers of the upper positioner or the inner positioner each comprise an actuator and a retaining arm, each of the retaining arms comprising a receptacle, and each of the respective retaining arms are vertically positionable via the respective actuator of each of the two back positioning towers of the upper positioner or the inner positioner.

18. The device according to claim 17, wherein each of the respective retaining arms of each of the two back positioning towers of the upper positioner or the inner positioner comprise at least one actuator, and the receptacles of each of the retaining arms of each of the two back positioning towers of the upper positioner or the inner positioner are vertically positionable using the at least one actuator of the retaining arms of each of the two back positioning towers of the upper positioner or the inner positioner.

19. The device of claim 1, further comprising:
a retaining frame; and
a plurality of receptacles, wherein the retaining frame is accommodated on the plurality of receptacles.

20. The device according to claim 19, wherein the retaining frame comprises at least one retaining unit for detachable connection of an upper shell.

21. The device according to claim 1,
wherein a first one of the two front positioning towers of the upper positioner or the inner positioner and a first one of the two back positioning towers of the upper positioner or the inner positioner are in a region of a longitudinal aircraft fuselage lateral shell section side, and a second one of the two front positioning towers of the upper positioner or the lower positioner and a second one of the two back positioning towers of the upper positioner and the lower positioner are in a region of another longitudinal aircraft fuselage lateral shell section side on an opposite side of the upper positioner or the inner positioner and a first one of the two back positioning towers of the upper positioner or the inner positioner.

22. The device according to claim 1, further comprising:
another guiding element, wherein the another guiding element is arranged on the base surface spaced apart from a longitudinal side and in a longitudinal direction along another longitudinal section side of another independent lateral shell of an aircraft fuselage opposite of the longitudinal section side of the independent lateral shell of an aircraft fuselage.

23. The device according to claim 21, wherein each of the two front positioning towers of the upper positioner or the inner positioner comprise a transferring unit guidably engaged on the guiding element of claim 1 or another guiding element arranged on the base surface.

24. The device according to claim 21, wherein the two back positioning towers of the upper positioner or the inner positioner are stationary and fixed on the base surface.

25. The device according to claim 21, wherein the two front and two back positioning towers of each of the upper positioner and the inner positioner each comprise a vertically displaceable retaining arm, and each vertically displaceable arm comprises a receptacle.

26. The device according to claim 25, wherein all of the receptacles are capable of being vertically positionable by at least one actuator.

27. The device according to claim 25, further comprising:
a retaining frame, wherein the retaining frame is accommodated on the receptacle of one of the vertically displaceable arms of the two front and two back positioning towers of the upper positioner or the inner positioner.

28. The device according to claim 27, wherein the retaining frame comprises at least one retaining unit for detachably connecting a floor scaffold.

29. The device according to claim 1, further comprising:
at least two working platforms.

30. The device according to claim 29, wherein each of the at least two working platforms comprise:
a retainer, wherein one of the retainers of one of the at least two working platforms is arranged on the base surface spaced parallel apart from a longitudinal section side of a independent lateral shell of an aircraft fuselage, and another of the retainers of another one of the at least two working platforms is arranged on the base surface spaced parallel apart from a longitudinal section side of another independent lateral shell opposite from the one of the retainers.

31. The device according to claim 30, wherein the retainers of each of the at least two working platforms comprise a retaining arm capable of being directed toward a respective one of the longitudinal section sides of the independent lateral shell or the another independent lateral shell, and the retainers of each of the at least two working platforms accommodate a working plane.

32. The device according to claim 31, wherein the working planes of each of the at least two working platforms may be moved to a respective one of the longitudinal section sides of the independent lateral shell or the another independent lateral shell using the retaining arm of the respective one of the at least two working platforms.

33. A device for joining and tacking a plurality of individual components independently of shape, size or both shape and size to form inherently rigid, transportable sections for an aircraft fuselage, wherein the device comprises:
a plurality of positioning devices, a first of the plurality of positioning devices is an upper positioner comprised of two front positioning towers and two back positioning towers; a second of the plurality of positioning devices is an inner positioner comprised of two front positioning towers and two back positioning towers, and the plurality of positioning devices are adapted such that the individual components of a barrel section of an aircraft fuselage are spatially positionable relative to each other independently of shape, size, or both shape and size by using the plurality of positioning devices;

a base surface, wherein one of the two front positioning towers of the upper positioner or the inner positioner and one of the two back positioning towers of the upper positioner or the inner positioner are in a region of a left longitudinal aircraft fuselage barrel section side, wherein the other one of the two front positioning towers of the upper positioner or the inner positioner and the other one of the two back positioning towers of the upper positioner or the inner positioner are in a region of a right longitudinal aircraft fuselage barrel section side, wherein the two front and the two back positioning towers of the upper positioner or the inner positioner are stationary and fixed in place on the base surface;

a traverse, wherein the traverse is arranged between the two front positioning towers of the upper positioner or the inner positioner, and the traverse is adapted such that the traverse is capable of being vertically displaced by actuators;

two carriages each comprising a receptacle, wherein the two carriages are slidably mounted via actuators on the traverse; and wherein one of the plurality of positioning devices is designed as a first lateral positioner, wherein the first lateral positioner comprises at least one positioning tower and at least one transferring unit, and the transferring unit is adapted to transfer the at least one positioning tower on a guiding element, wherein the guiding element is arranged on the base surface and is spaced substantially apart from a longitudinal aircraft fuselage lateral shell section side.

34. A method for joining and tacking a plurality of individual components independently of shape, size or both shape and size to form inherently rigid, transportable sections for a commercial passenger aircraft fuselage using the device of claim 1, the method comprising:

determining spatial positions of the individual components using a measuring device, varying the spatial positions of the individual components using the plurality of positioning devices of claim 1 until a preset spatial position of the individual components has been attained; and tacking together the individual components into a commercial passenger aircraft fuselage barrel section when the preset spatial position has been attained.

35. The method according to claim 34, wherein the individual components are tacked together with the lowest possible tackout level sufficient to ensure an adequate inherent rigidity of the section.

36. The method according to claim 34, wherein the step of varying the spatial positions comprises positioning a lower shell, two lateral shells, an upper shell and a floor scaffold to form the section.

37. The method according to claim 34, wherein the step of varying the spatial positions comprises positioning a lower half shell with a floor scaffold and an upper half shell to form the section.

38. The method according to claim 34, further comprising:
controlling the method by an open-loop controller, a closed-loop controller or both thereof.

39. The method according to claim 34, wherein the step of determining spatial positions includes using a laser measuring device for determining the spatial positions of the individual components.

* * * * *